US010793371B2

(12) United States Patent
Hou (10) Patent No.: US 10,793,371 B2
(45) Date of Patent: Oct. 6, 2020

(54) CONVEYOR BELT MANAGEMENT SYSTEM

(71) Applicant: THE YOKOHAMA RUBBER CO., LTD., Minato-Ku, Tokyo (JP)

(72) Inventor: Gang Hou, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 16/604,416

(22) PCT Filed: Dec. 18, 2017

(86) PCT No.: PCT/JP2017/045344
§ 371 (c)(1),
(2) Date: Oct. 10, 2019

(87) PCT Pub. No.: WO2018/189959
PCT Pub. Date: Oct. 18, 2018

(65) Prior Publication Data
US 2020/0156879 A1    May 21, 2020

(30) Foreign Application Priority Data

Apr. 14, 2017    (JP) .................................. 2017-080860

(51) Int. Cl.
*B65G 43/02* (2006.01)
*B65G 43/00* (2006.01)
(Continued)

(52) U.S. Cl.
CPC ......... *B65G 43/02* (2013.01); *G05B 23/0283* (2013.01); *G06Q 10/087* (2013.01);
(Continued)

(58) Field of Classification Search
None
See application file for complete search history.

(56) References Cited

U.S. PATENT DOCUMENTS 7,921,000 B2     4/2011  Ohkura et al.
9,811,809 B2 *  11/2017  Sakuragi ................ B65G 43/02
(Continued)

FOREIGN PATENT DOCUMENTS

JP    S58-113021 A    7/1983
JP    2005-258585 A    9/2005
(Continued)

*Primary Examiner* — Kavel Singh
(74) *Attorney, Agent, or Firm* — Carrier Blackman & Associates, P.C.; Joseph P. Carrier; Jeffrey T. Gedeon (57) ABSTRACT

A conveyor belt management system is capable of determining in detail the state of a conveyor belt, more reliably preventing the conveyor belt becoming unusable, determining a suitable replacement period, and lowing the running costs of the conveyor belt. A state of the conveyor belt is monitored by a calculation unit and an expected service life before use is calculated based on data of an indicator indicating a status of a belt conveyor device and an indicator indicating a use environment of the conveyor belt; at least one data from an amount of wear, an impact force, a tensile force, a state of a core, and an indicator indicating a state of an endless portion; and a belt specification database and a tolerance range database in which a tolerance range for each of the input items in input in advance per belt specification stored in a storage unit.

6 Claims, 8 Drawing Sheets

(51) Int. Cl.
   *G05B 23/02* (2006.01)
   *G06Q 10/08* (2012.01)
   *G06Q 10/00* (2012.01)

(52) U.S. Cl.
   CPC ..... *G06Q 10/20* (2013.01); *B65G 2203/0275* (2013.01); *B65G 2203/042* (2013.01)

(56) References Cited

U.S. PATENT DOCUMENTS

| | | | |
|---|---|---|---|
| 9,894,934 B2 * | 2/2018 | Li | A61M 15/06 |
| 10,294,038 B2 | 5/2019 | Hou | |
| 2009/0303065 A1 * | 12/2009 | Lipowski | B65G 43/02 340/679 |

FOREIGN PATENT DOCUMENTS

| | | |
|---|---|---|
| WO | 2005/106139 A1 | 11/2005 |
| WO | 2013/179903 A1 | 12/2013 |
| WO | 2017/033506 A1 | 3/2017 |

* cited by examiner

FIG. 1

| BELT SPECIFICATION | | A | B | C | D |
|---|---|---|---|---|---|
| UPPER COVER RUBBER | RUBBER TYPE | ZZ | ZX | ZZ | ZY |
| | LAYER THICKNESS | 10 | 10 | 15 | 10 |
| LOWER COVER RUBBER | RUBBER TYPE | ZA | ZA | ZA | ZA |
| | LAYER THICKNESS | 8 | 8 | 10 | 8 |
| CORE | MATERIAL | XX | XX | XY | XX |
| | OUTER DIAMETER | 10 | 10 | 12 | 10 |
| CORE LAYER | NUMBER OF CORES | 50 | 60 | 80 | 50 |
| | GAP IN THE WIDTH DIRECTION BETWEEN CORES | 2~3 | 2~3 | 3~4 | 2~3 |
| ENDLESS PORTION BONDING LENGTH | | 500 | 600 | 800 | 500 |

| BELT SPECIFICATION | INPUT ITEM | TOLERANCE RANGE |
|---|---|---|
| A | $P1$ | x OR LESS |
| | $P2$ | y OR LESS |
| | $P3$ | z OR GREATER AND zx OR LESS |
| | $P4$ | xx OR LESS AND xy OR LESS |
| | $P5$ | xz OR LESS |
| | $P6_1$ | yy OR GREATER AND yz OR LESS |
| | $P6_2$ | . . . . . |
| | $P7_1$ | yy OR GREATER AND yz OR LESS |
| | $P7_2$ | . . . . . |
| | $P7_3$ | . . . . . |
| | $P7_4$ | . . . . . |
| B | ⋮ | ⋮ |
| C | ⋮ | ⋮ |
| D | ⋮ | ⋮ |

CONVEYOR BELT MANAGEMENT SYSTEM

TECHNICAL FIELD

The present invention relates to a conveyor belt management system and particularly relates to a conveyor belt management system capable of determining in detail the state of a conveyor belt, reliably preventing the conveyor belt becoming unusable, determining a suitable replacement period of the conveyor belt as early as possible, and lowering the running costs of the conveyor belt.

BACKGROUND ART

Various conveyed objects, including mineral resources such as iron ore and limestone, are conveyed by a conveyor belt. An upper cover rubber of a conveyor belt is worn over time by conveyed objects being fed onto the upper cover rubber. The conveyed objects fed onto the upper cover rubber impact against the upper cover rubber, and conveyed objects that are sharp can cause cuts in the surface of the upper cover rubber. The core of the conveyor belt may be cut due to flexural fatigue or abnormal tensile forces. In addition to the above, damage to the conveyor belt may be caused by many factors, and if the damage is excessive, the conveyor belt becomes unusable.

If a conveyor belt becomes unusable, the belt line is stopped, and the conveying of the conveyed objects is significantly affected. In the related art, various management systems for determining the state of a conveyor belt are proposed (for example, see Patent Document 1). In this management system, only the amount of wear of the conveyor belt is determined.

However, there are various other factors such as those described above, not only wear, that actually render the conveyor belt unusable. Thus, there is room for improvement to more reliably prevent the conveyor belt becoming unusable.

Also, if the replacement period of a conveyor belt is unknown, then more replacement conveyor belts than necessary must be kept in inventory and inventory management becomes necessary. As a result, running costs are greatly increased. Furthermore, if the type of conveyed objects conveyed by the conveyor belt changes, the replacement conveyor belts in inventory may not be used.

However, the management system proposed in Patent Document 1 is not capable of determining the remaining service life unless the conveyor belt has been used and the rubber worn a certain amount. Additionally, when the amount of wear of the rubber is low, the prediction accuracy of the remaining service life is low. Thus, there is room for improvement to lower the running costs of the conveyor belt by determining a suitable replacement period for the conveyor belt as early as possible.

CITATION LIST

Patent Literature

Patent Document 1: WO 2013/179903 A

SUMMARY OF INVENTION

Technical Problem

An object of the present invention is to provide a conveyor belt management system capable of determining in detail the state of a conveyor belt, reliably preventing the conveyor belt becoming unusable, determining a suitable replacement period of the conveyor belt as early as possible, and lowering the running costs of the conveyor belt.

Solution to Problem

In order to achieve the objects described above, a conveyor belt management system according to an embodiment of the present invention comprises:

an input unit configured to input an indicator indicating a state of a belt conveyor device installed on site and an indicator indicating a use environment of a conveyor belt at a use site;

an input unit configured to input at least one input item from five input items consisting of an amount of wear of an upper cover rubber of the conveyor belt, an impact force acting on the conveyor belt, a tensile force, an indicator indicating a state of a core, and an indicator indicating a state of an endless portion; and a server into which data of each of the input items are input;

the server comprising a calculation unit and a storage unit, the storage unit being configured to store a belt specification database in which specifications of the conveyor belt are input in advance and a tolerance range database in which a tolerance range for each of the input items input into the server per each of the specifications of the conveyor belt is input in advance, and the calculation unit being configured to monitor a state of the conveyor belt based on the data of each of the input items input into the server, the specifications of the conveyor belt input into the belt specification database, and the tolerance range input into the tolerance range database; and the calculation unit is configured to calculate before the conveyor belt is installed on the belt conveyor device an expected service life of the conveyor belt based on a use condition of the belt conveyor device at the use site, specifications of the conveyor belt input into the belt specification database, and a correlation determined in advance between the use condition and the specifications of the conveyor belt and an actual service life of the conveyor belt.

Advantageous Effects of Invention

According to an embodiment of the present invention, to monitor the state of the conveyor belt, in addition to the indicator indicating the state of the belt conveyor device and the indicator indicating the use environment of the conveyor belt at the use site, at least one input item from five input items consisting of an amount of wear of an upper cover rubber of the conveyor belt, an impact force acting on the conveyor belt, a tensile force, an indicator indicating a state of a core, and an indicator indicating a state of an endless portion is used. Accordingly, the state of the conveyor belt can be determined in more detail than in the related art. This is advantageous in that the conveyor belt becoming unusable is more reliably prevented.

Furthermore, the expected service life of the conveyor belt is calculated beforehand based on the correlation between the use condition and belt specifications of the conveyor belt used up until present and the actual service life, the use condition of the conveyor belt, and the belt specifications. This allows the replacement period of the conveyor belt to be determined in the early stages. Thus, the time and funds needed for preparing the replacement conveyor belt can be easily secured. This is advantageous in that excess inventory of the conveyor belt can be reduced, the time in inventory can be easily shortened, and the running costs of the conveyor belt can be lowered.

DESCRIPTION OF EMBODIMENTS

A conveyor belt management system according to embodiments of the present invention will be described below with reference to the drawings.

Figure 1:
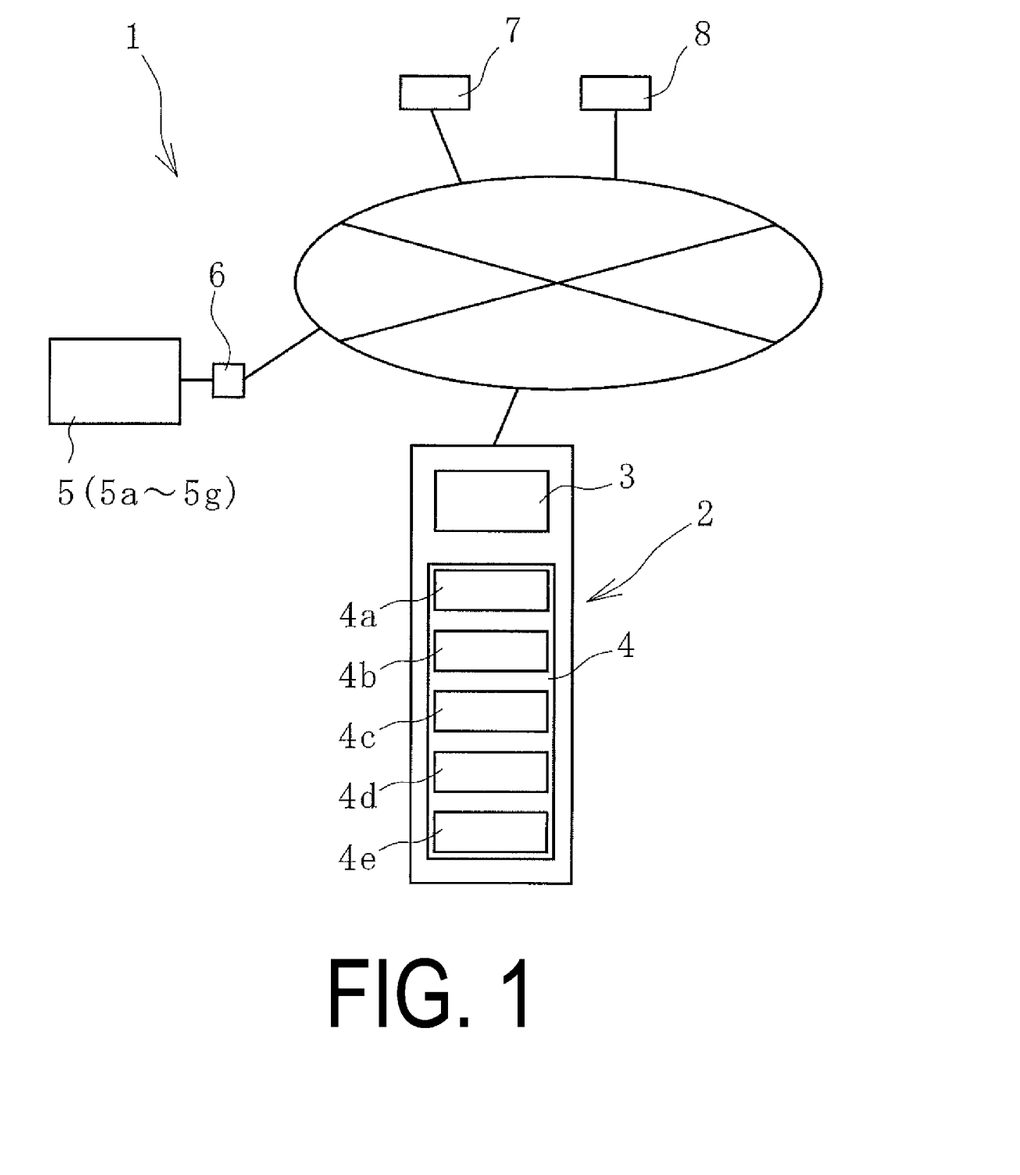
FIG. 1 is an explanatory diagram illustrating an overview of a conveyor belt management system according to an embodiment of the present invention.
Figure 6:
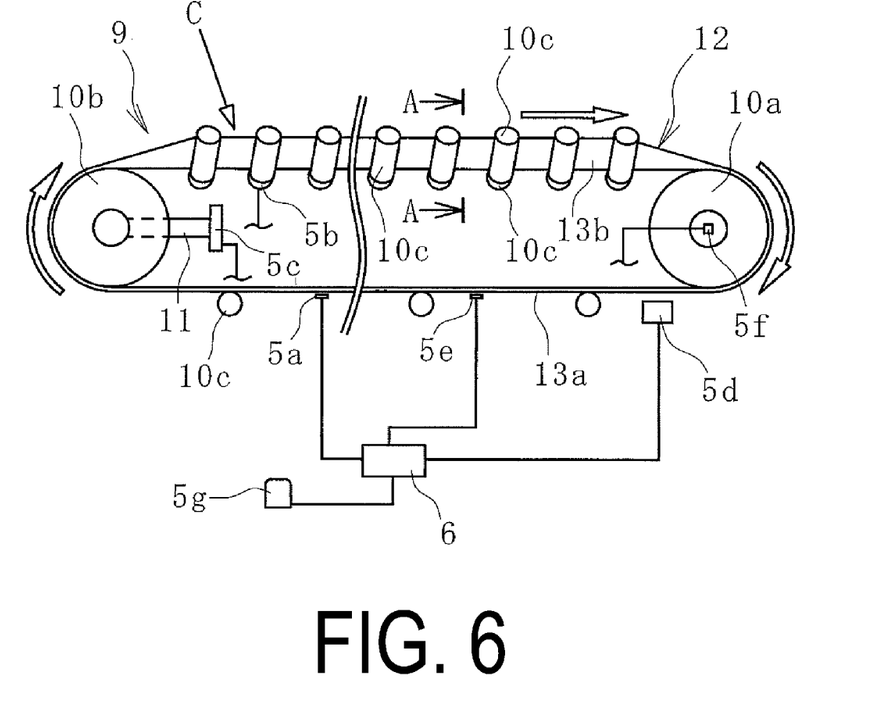
FIG. 6 is an explanatory diagram simply illustrating a belt conveyor device mounted with a conveyor belt in a side view.
Figure 7:
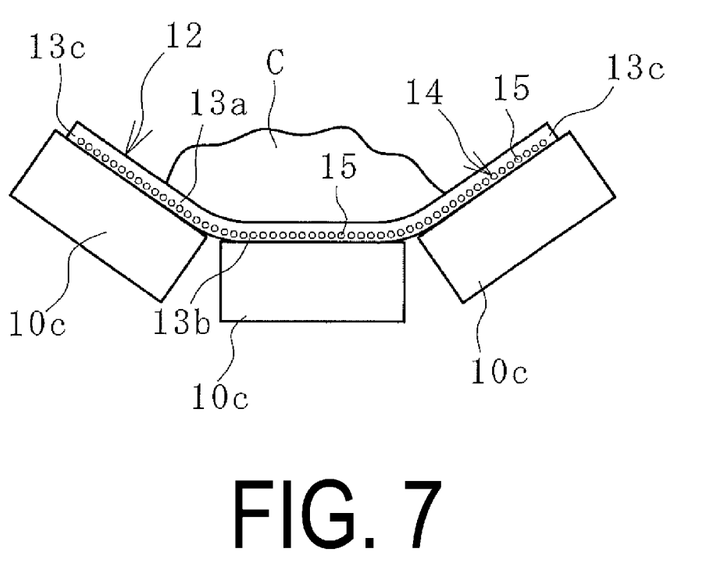
FIG. 7 is a cross-sectional view taken along A-A of FIG. 6.

A conveyor belt management system 1 (hereinafter referred to as management system 1) according to an embodiment of the present invention illustrated in FIG. 1 monitors the use state of a conveyor belt 12 installed on a belt conveyor device 9 at a use site illustrated in FIGS. 6 and 7. The management system 1 calculates an expected service life Jf before the conveyor belt 12 is used. In this embodiment, a remaining service life Ja is calculated during the use period of the conveyor belt 12.

In the belt conveyor device 9, the conveyor belt 12 is mounted around a drive pulley 10a and a driven pulley 10b at a predetermined tension. Between the drive pulley 10a and the driven pulley 10b, the conveyor belt 12 is supported by support rollers 10c disposed at appropriate intervals in the belt longitudinal direction.

The conveyor belt 12 is constituted by a core layer 14 including a core 15 made of a steel cord or canvas, and an upper cover rubber 13a and a lower cover rubber 13b that sandwich the core layer 14 therebetween. The core layer 14 is a member bearing the tension caused when the conveyor belt 12 is mounted at tension. The conveyor belt 12 may include additional necessary members, such as a width direction end portion rubber 13c or a reinforcing layer, as appropriate.

The lower cover rubber 13b is supported by the support rollers 10c on a carrying side of the conveyor belt 12, and the upper cover rubber 13a is supported by the support rollers 10c on a return side of the conveyor belt 12. Three of the support rollers 10c are arranged on the carrying side of the conveyor belt 12 side by side in the belt width direction. The conveyor belt 12 is supported by these support rollers 10c in a recessed shape having a prescribed trough angle.

The drive pulley 10a is rotationally driven by a drive motor. A take-up mechanism 11 moves the driven pulley 10b to apply a desired tension to the conveyor belt 12 (core layer 14) by changing the interval between the drive pulley 10a and the driven pulley 10b.

Figure 8:
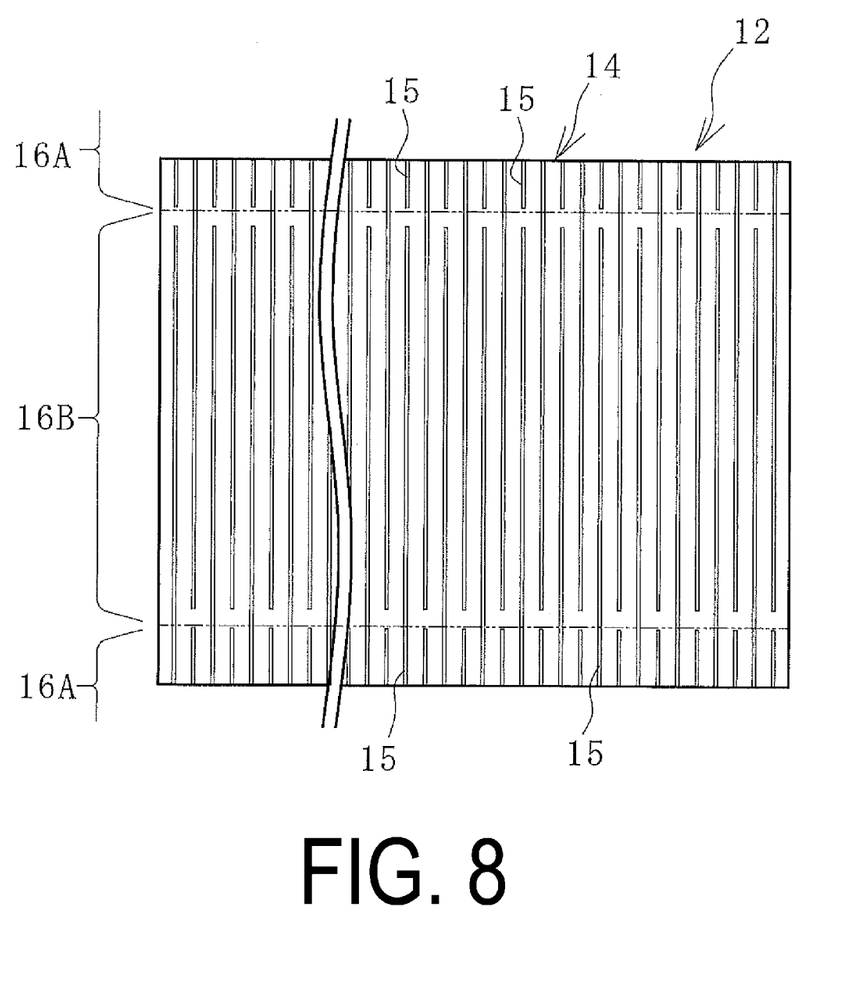
FIG. 8 is an explanatory diagram illustrating the structure of an endless portion of the conveyor belt of FIG. 6 in a plan view.

The conveyor belt 12 may be formed from a plurality of conveyor belts of any length by splicing together the longitudinal end portions of the core layers 14 of the conveyor belts to form an annular shape. In the case of a conveyor belt 12 having a short circumferential length, the longitudinal end portions of the core layer 14 of one conveyor belt 12 may be spliced together to form an annular shape. Thus, as illustrated in FIG. 8, the conveyor belt 12 includes a portion where the core layer 14 is spliced together in the longitudinal direction (an endless portion 16B) and a non-endless portion 16A disposed adjacent to one another in the longitudinal direction. In the conveyor belt 12, the core layer 14 is formed from a plurality of steel cords 15 arranged side by side in the belt width direction. In the endless portion 16B, every second steel cord 15 extending from each of the non-endless portions 16A on opposite sides in the belt longitudinal direction is inserted between the steel cords 15 on the other side in the belt width direction.

In a case in which the core layer 14 is made of canvas, in the endless portion 16B, the canvas extending from each of the non-endless portions 16A on opposite sides in the belt longitudinal direction may have a known structure such as being joined in a step shape. In the non-endless portion 16A, the core layer 14 is continuous without a joint, but in the endless portion 16B, the core layer 14 has such a joint. Thus, the endless portion 16B and the non-endless portion 16A show differences in elongation, tensile strength, and flexibility (bending rigidity).

Conveyed objects C conveyed by another conveyor belt are fed onto the upper cover rubber 13a of the conveyor belt 12 and conveyed to a conveying destination by the conveyor belt 12. The conveyed objects C may be fed onto the conveyor belt 12 via a hopper or the like.

The upper cover rubber 13a is subjected to impact from the fed conveyed objects C. Additionally, on the upper cover rubber 13a, the conveyed objects C immediately after being fed and placed press against the upper cover rubber 13a with a predetermined surface pressure and move in a direction opposite to the running direction of the conveyor belt 12. At this time, friction force acts on the upper cover rubber 13a. The upper cover rubber 13a is worn primarily by this behavior of the conveyed objects C. The width direction end portion rubber 13c may slide and wear against a guide or the like of the belt conveyor device 9. The lower cover rubber 13b may slide and wear against the support rollers 10c that cannot rotate or not rotate smoothly. The lower cover rubber 13b may wear due to slippage between the lower cover rubber 13b and the pulleys 10a, 10b due to insufficient tension acting on the conveyor belt 12 or the like. The lower cover rubber 13b may slide and wear against a scraper provided to remove the conveyed objects C that have dropped onto the lower cover rubber 13b.

The management system 1 includes an input unit 5 (5a to 5g) and a server 2 into which data is input by the input unit 5. The server 2 includes a calculation unit 3 (microprocessor) and a storage unit 4 (memory).

The input unit 5 and the server 2 are communicably connected. In this embodiment, the management system 1 includes seven types of input units 5a to 5g, and the input units 5 are connected to a transmission unit 6. The data input by the input unit 5 is transmitted from the transmission unit 6 to the server 2. In addition, the server 2 is communicably connected to a customer terminal device 7 and a manufacturer terminal device 8. For example, a personal computer or the like is used for the customer terminal device 7 and the manufacturer terminal device 8. The server 2, the input unit 5, the customer terminal device 7, and the manufacturer terminal device 8 can each be connected through, for example, an Internet network.

The server 2 is installed, for example, in the company of the distributor that distributes the conveyor belt 12. The input unit 5 is disposed, for example, at the use site of the conveyor belt 12. The customer terminal device 7 is installed, for example, in the company of the user of the conveyor belt 12. The manufacturer terminal device 8 is installed, for example, in the company (factory) of the manufacturer of the conveyor belt 12. When the distributor and the manufacturer of the conveyor belt 12 are the same (manufacturer/distributor of the conveyor belt 12), for example, the server 2 and the manufacturer terminal device 8 are disposed in the company of the manufacturer/distributor.

The frequency at which data is input to the server 2 by the input units 5 may be irregular, with an appropriate number of times during one week or one month, but the frequency is preferably regular with a certain time period. The frequency of input may be, for example, once per day, once per week, once per month, or the like.

The input item of the wear amount input unit 5a is an amount of wear P1 of the upper cover rubber 13a of the conveyor belt 12. However, the amount of wear of the lower cover rubber 13b and/or the width direction end portion rubber 13c may also be included as an input item. For the wear amount input unit 5a, various types of wear amount sensors can be employed for detecting the amount of wear P1 of the upper cover rubber 13a. Alternatively, an input terminal device (such as a personal computer) into which a worker inputs the amount of wear P1 data into the server 2 can be used as the wear amount input unit 5a.

The input item of the impact force input unit 5b is an impact force P2 that acts on the conveyor belt 12, the input item of the tensile force input unit 5c is a tensile force P3 that acts on the conveyor belt 12, the input item of the core state input unit 5d is an indicator P4 indicating the state of the core 15, the input item of the endless portion state input unit 5e is an indicator P5 indicating the state of the endless portion 16B, the input item of the device state input unit 5f is an indicator P6 indicating the state of the belt conveyor device 9, and the input item of the use environment input unit 5g is an indicator P7 indicating the use environment of the conveyor belt 12.

In an embodiment of the present invention, the input unit 5 is only required to have as an input item the indicator P6 indicating the state of the belt conveyor device 9, and the indicator P7 indicating the use environment of the conveyor belt 12, and at least one of the five input items (P1 to P5) described above. Thus, in the use period of the conveyor belt 12, a configuration may be employed in which, in addition to the data of the indicator P6 and the indicator P7, one, two, three, or four input items selected from the five input items (P1 to P5) are input by the input unit 5. Alternatively, a configuration may be employed in which the seven input items (P1 to P7) are input by the input unit 5, such as in this embodiment.

For the impact force input unit 5b, various types of impact force sensors can be employed for detecting the impact force P2 acting on the conveyor belt 12 (upper cover rubber 13a). Alternatively, an input terminal device (such as a personal computer) into which a worker inputs the impact force P2 data into the server 2 can be used as the impact force input unit 5b.

For the tensile force input unit 5c, various types of tensile force sensors can be employed for detecting the tensile force P3 acting on the conveyor belt 12 (core layer 14). Alternatively, an input terminal device (such as a personal computer) into which a worker inputs the tensile force P3 data into the server 2 can be used as the tensile force input unit 5c.

An example of the indicator P4 indicating the state of the core 15 includes the gap between the cores 15 arranged side by side in the belt width direction. For example, an X-ray device that detects the gap in the width direction by X-ray radiation may be used for the core state input unit 5d. Alternatively, an input terminal device (such as a personal computer) into which a worker inputs the indicator P4 data into the server 2 can be used as the core state input unit 5d.

Examples of the indicator P5 indicating the state of the endless portion 16B include a bonding length of the endless portion 16B and a surface state (unevenness) of the endless portion 16B. For the endless portion state input unit 5e, for example, a length sensor that detects the interval between marks (colored rubber, engravings, or the like) embedded at both positions at the longitudinal ends of the endless portion 16B, a digital camera that recognizes the surface state of the endless portion 16B, and the like may be employed. Alternatively, an input terminal device (such as a personal computer) into which a worker inputs the indicator P5 data into the server 2 can be used as the endless portion state input unit 5e.

Examples of the indicator P6 indicating the state of the belt conveyor device 9 include the conveyance speed of the conveyed objects C, the conveyance weight per unit time, the outer diameter of the pulleys 10a, 10b and the support rollers 10c, the amount of power required to operate the belt conveyor device 9, and the like. For the device state input unit 5f, for example, a speed sensor for detecting the conveyance speed of the conveyed objects C, a weight sensor for detecting the conveyance weight per unit time, a power meter, and the like may be employed. Alternatively, an input terminal device (such as a personal computer) into which a worker inputs the indicator P6 data into the server 2 can be used as the device state input unit 5f.

Examples of the indicator P6 indicating the state of the belt conveyor device 9 include the conveyance speed of the conveyed objects C, the conveyance weight per unit time, the outer diameter of the pulleys 10a, 10b and the support rollers 10c, and the like. For the device state input unit 5f, for example, a speed sensor for detecting the conveyance speed of the conveyed objects C, a weight sensor for detecting the conveyance weight per unit time, and the like may be employed. Alternatively, an input terminal device (such as a personal computer) into which a worker inputs the indicator P6 data into the server 2 can be used as the device state input unit 5f.

Examples of the indicator P7 indicating the use environment of the conveyor belt 12 include the use environment temperature and humidity, specifications of the conveyed objects C (material (hardness, oil content), shape, temperature, and the like), and the like. For the use environment input unit 5g, for example, a temperature sensor, a humidity sensor, a hardness sensor, a digital camera that recognizes the shape of the conveyed objects C, and the like can be employed. Alternatively, an input terminal device (such as a personal computer) into which a worker inputs the indicator P7 data into the server 2 can be used as the use environment input unit 5g.

The storage unit 4 stores a belt specification database 4a in which the specifications of the conveyor belt 12 are input in advance, a tolerance range database 4b in which the tolerance ranges for each of the input items (P1 to P7) are input in advance per specification of the conveyor belt 12, a use condition database 4c, and a correlation database 4d.

In this embodiment, an inventory database 4e is stored in the storage unit 4. An inventory amount (inventory length) of replacement conveyor belts 12a for the conveyor belt 12 at the use site of the conveyor belt 12 or at a stockyard near the use site of the conveyor belt is input into the inventory database 4e. Note that the currently used conveyor belt 12 and the replacement conveyor belt 12a may have the same specifications but may also have different specifications. For example, the currently used conveyor belt 12 and the replacement conveyor belt 12a may differ in the material of the upper cover rubber 13a.

Figure 2:
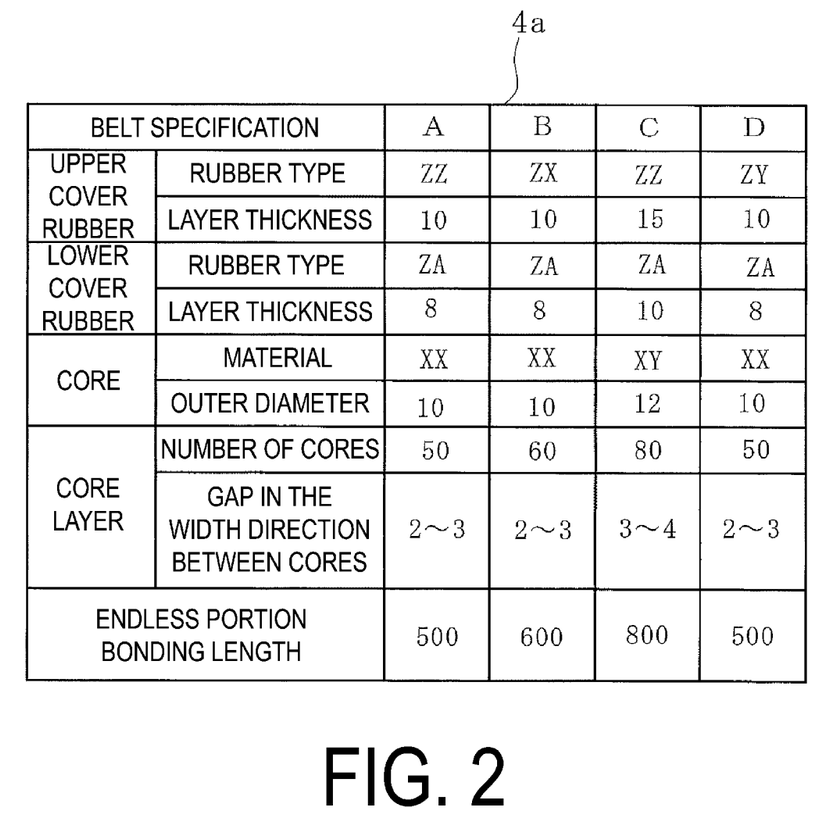
FIG. 2 is an explanatory diagram illustrating a belt specification database.

As illustrated in FIG. 2, the material, size, and the like of the constituent members per conveyor belt specification (specification A, B, C, . . . ) are input into the belt specification database 4a. For example, rubber types (rubber physical properties) and layer thicknesses of the upper cover rubber 13a and the lower cover rubber 13b, the material (physical properties) and the outer diameter of the core 15, the number of cores 15 constituting the core layer 14, the gap in the width direction between the cores 15 arranged side by side, the bonding length of the endless portion 16B, and the like are input.

Figure 3:
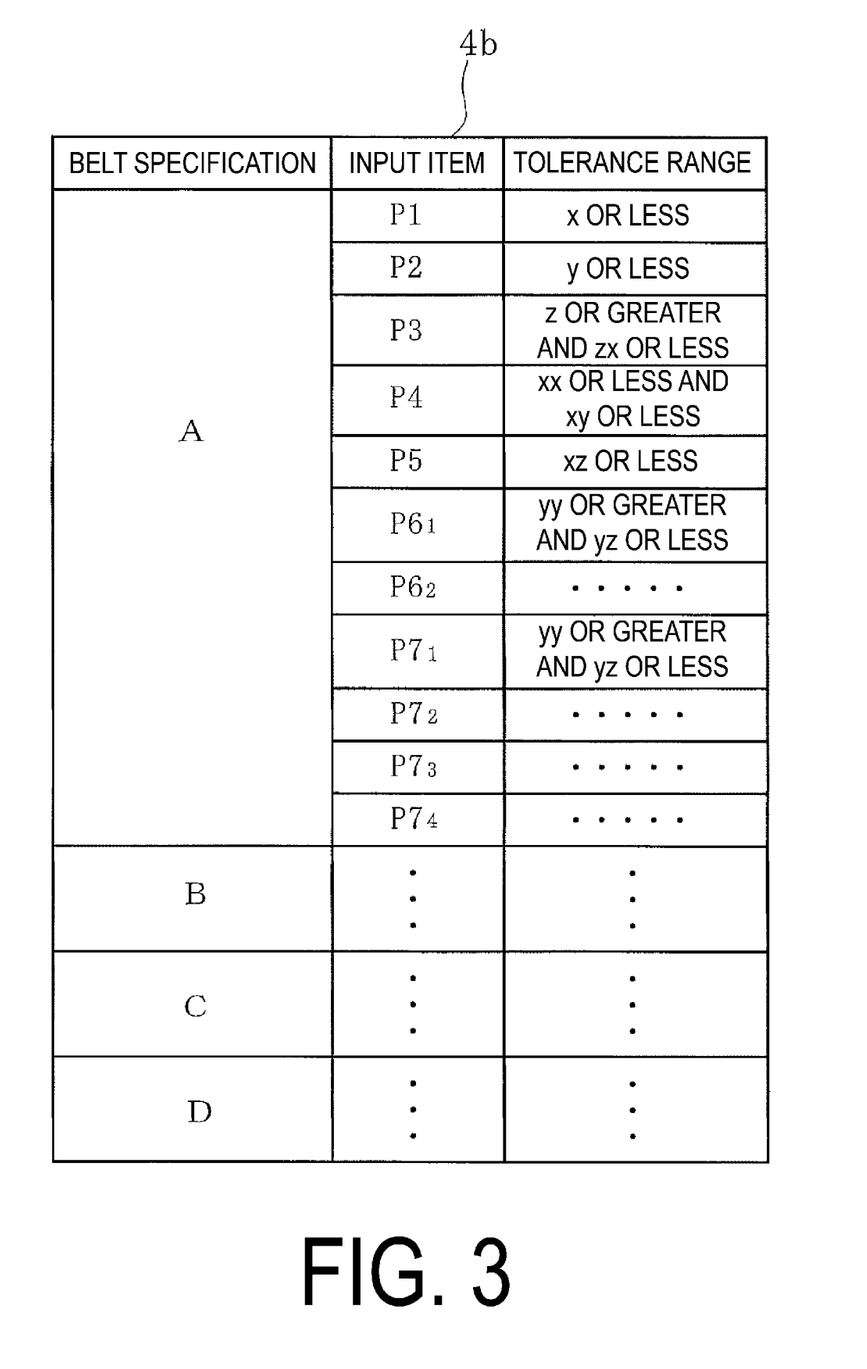
FIG. 3 is an explanatory diagram illustrating a tolerance range database.

As illustrated in FIG. 3, the tolerance range for each input item (P1 to P7) per specification (specification A, B, C, . . . ) of the conveyor belt 12 are input into the tolerance range database 4b. In this embodiment, seven input items (P1 to P7) are input into the server 2, with the tolerance ranges of the seven input items. However, in an embodiment in which three input items, the indicator P6, the indicator P7, and one other input item, are input into the server 2, it is only required that the tolerance ranges of these three input items are input into the tolerance range database 4b.

Over time, excessively high levels of the amount of wear P1 of the upper cover rubber 13a may cause failure. Thus, for example, a tolerance range with a predetermined upper limit is set for the amount of wear P1.

Excessively high levels of the impact force P2 may cause failure. Thus, for example, a tolerance range with a predetermined upper limit is set for the impact force P2.

Excessively high levels of the tensile force P3 may cause failure. Excessively low levels may cause failure due to wandering. Thus, for example, a tolerance range with a predetermined upper limit and lower limit is set for the tensile force P3.

Over time, excessively high levels and low levels of the gap in the width direction between the cores 15, which is an example of the indicator P4, may cause failure. Thus, for example, a tolerance range with a predetermined upper limit and lower limit is set for the gap in the width direction P4.

Over time, excessively high levels of the bonding length of the endless portion 16B, which is an example of the indicator P5, may cause peeling at the bond. Thus, for example, a tolerance range with a predetermined upper limit is set for the bonding length P5.

Excessively high levels of the conveyance speed $P6_1$, which is an example of the indicator P6, may cause the amount of wear P1 of the upper cover rubber 13a to increase. Excessively low levels may cause the load weight of the conveyed objects C per unit area to increase, increasing the load on the conveyor belt 12. Thus, for example, a tolerance range with a predetermined upper limit and lower limit is set for the conveyance speed $P6_1$. Excessively high levels of the conveyance weight $P6_2$ per unit time, which is an example of the indicator P6, may cause the load on the conveyor belt 12 to increase. Thus, for example, a tolerance range with a predetermined upper limit is set for the conveyance weight $P6_2$ per unit time.

Excessively high levels and low levels of the typical use environment temperature $P7_1$ and humidity $P7_2$, which are examples of the indicators P7, may cause failure of the conveyor belt 12. Thus, for example, a tolerance range with a predetermined upper limit and lower limit is set for the temperature $P7_1$ and the humidity $P7_2$. Excessively high levels of the hardness $P7_3$ of the conveyed objects C, which is another example of the indicator P7, may cause damage to the upper cover rubber 13a. Thus, for example, a tolerance range with a predetermined upper limit is set for the hardness $P7_3$. When the shape $P7_4$ of the conveyed objects C, which is another example of the indicator P7, includes a portion with an acute angle on the outer surface, the upper cover rubber 13a may be damaged. Thus, for example, a tolerance range with a predetermined upper limit for the proportion of fed conveyed objects C including a portion with an acute angle on the surface of the conveyed objects C is set for the shape $P7_4$ of the conveyed objects C.

Figure 4:
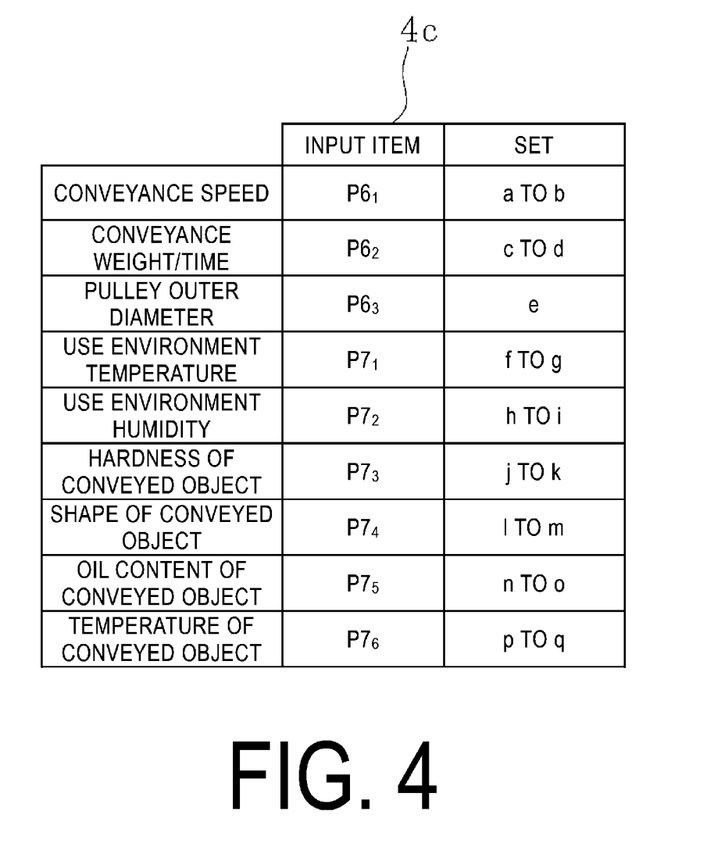
FIG. 4 is an explanatory diagram illustrating a use condition database.

As illustrated in FIG. 4, the use condition for the belt conveyor device 9 at the use site has been input into the use condition database 4c. Examples of the use condition include the conveyance speed of the conveyed objects C, the conveyance weight per unit time, the outer diameter of the pulleys 10a, 10b and the support rollers 10c, and the like. Other examples of the use condition include the use environment temperature and humidity of the conveyor belt 12, specifications of the conveyed objects C (material (hardness, oil content), shape, temperature, and the like), and the like.

In other words, the use condition overlaps with the input items P6, P7 described above. Thus, the device state input unit 5f and the use environment input unit 5g can be used to input the use condition data into the server 2. The use condition is newly updated each time the use condition change, such as when the type of the conveyed objects C changes.

Data indicating the correlation between the use condition and conveyor belt specifications of the multiple conveyor belts used up until the present and an actual service life Jr of the conveyor belt is input into the correlation database 4d. In other words, by analyzing the data of the use condition (input items P6, P7 described above), the belt specifications, and the actual service life Jr of the conveyor belt 12 collected up until the present, the correlation between the use condition, the belt specifications, and the actual service life Jr is determined in advance.

For example, quantitative correlations including: as the conveyance speed $P6_1$ becomes faster, the actual service life Jr decreases and as the conveyance weight $P6_2$ per unit time increases, the actual service life Jr decreases; are input into the correlation database 4d. Also, quantitative correlations including: as the use environmental temperature $P7_1$ and humidity $P7_2$ increase, the actual service life Jr decreases and as the hardness $P7_3$ of the conveyed objects C increases, the actual service life Jr decreases; and as shape $P7_4$ of the conveyed objects C corresponding to the proportion of conveyed objects C including a portion with an acute angle on the outer surface increases, the actual service life Jr decreases; are input into the correlation database 4d.

Figure 5:
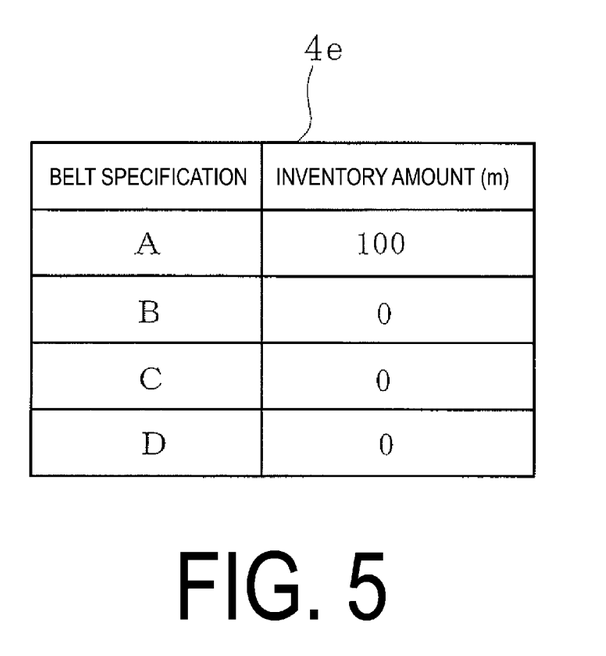
FIG. 5 is an explanatory diagram illustrating an inventory database.

As illustrated in FIG. 5, the inventory amount (inventory length) per conveyor belt specification (specification A, B, C, . . . ) is input into the inventory database 4e. The inventory database 4e is updated when a replacement conveyor belt 12a comes in or goes out. Thus, it corresponds to the state of the most current input of the inventory amount.

The calculation unit 3 is configured to monitor the state of the conveyor belt 12 in use on the basis of the input item (P1 to P7) data input by the input unit 5, the specifications of the conveyor belt 12 input into the belt specification database 4a, and the tolerance ranges of the input items (P1 to P7) input into the tolerance range database 4b.

In this embodiment, the calculation unit 3 is configured to calculate the remaining service life Ja of the conveyor belt 12 on the basis of the amount of wear P1 data input by the wear amount input unit 5a, the specifications of the conveyor belt 12 input into the belt specification database 4a, and the tolerance range of the amount of wear P1 input into the tolerance range database 4b. In this configuration, the calculated length of the remaining service life Ja is monitored as one of the states of the conveyor belt 12.

Specifically, the data of each input item input into the server 2 and the corresponding tolerance range are compared over time. Then, it is monitored whether the input data is within the tolerance range or outside the tolerance range. If the data is outside the tolerance range, it is determined to be an abnormal state for the input item of the data, and the portions, equipment, and the like relating to the input item are checked.

In an embodiment in which the amount of wear P1 data is input, in addition to the data of the input items P6, P7, the correlation between the use condition and the amount of wear P1 is clearly defined. In an embodiment in which the impact force P2 data is input, in addition to the data of the input items P6, P7, the correlation between the use condition and the impact force P2 is clearly defined. In an embodiment in which the tensile force P3 data is input, in addition to the data of the input items P6, P7, the correlation between the use condition and the tensile force P3 is clearly defined. In an embodiment in which the indicator P4 indicating the state of the core is input, in addition to the data of the input items P6, P7, the correlation between the use condition and the indicator P4 is clearly defined. In an embodiment in which the indicator P5 indicating the state of the endless portion 16B is input, in addition to the data of the input items P6, P7, the relationship between the use condition and the indicator P5 is clearly defined.

In an embodiment of the present invention in which two or more input item data are input in addition to the data of the input items P6, P7, the correlation between the use condition and each of the input items is clearly defined. Examples include a configuration in which the amount of wear P1 and the impact force P2 are input in addition to the data of the input items P6, P7, a configuration in which the data of the tensile force P3 and the indicator P5 indicating the state of the endless portion 16B are input in addition to the data of the input items P6, P7, and a configuration in which the data of the tensile force P3, the indicator P4 indicating the state of the core, and the indicator P5 indicating the state of the endless portion 16B are input in addition to the data of the input items P6, P7.

With respect to calculating the remaining service life Ja, the change in the amount of wear P1 has the greatest impact on the remaining service life Ja as compared to other input items. Thus, for example, the variation (rate of variation) of the wear amount P1 data relative to the tolerance range is calculated. Based on the calculated variation, the time required for the data of the input amount of wear P1 to be outside of the tolerance range is calculated, and the calculated time is taken as the remaining service life Ja.

Because the change in the bonding length P5 of the endless portion 16B has a relatively great impact on the remaining service life Ja as compared to other input items, the time required for the input bonding length P5 to be outside of the tolerance range is calculated based on the variation (variation rate) of the bonding length P5 data relative to the tolerance range, and the calculated time is taken as a temporary remaining service life $Jb_2$. Then, the time required for the amount of wear P1 data described above to be outside of the tolerance range is taken as a temporary remaining service life $Jb_1$, and the shortest one of the temporary remaining service lives $Jb_1$, $Jb_2$ can be taken as the remaining service life Ja.

For other input items (P2 to P4, P6, P7), for example, if the data input into server 2 is within the tolerance range, the remaining service life Ja is calculated without taking these data into account. However, if these data are outside of the tolerance range, the remaining service life Ja is calculated using these data as described below.

In a case of these input item (P2 to P4, P6, P7) data being outside of the tolerance range, the load on the conveyor belt 12 may be considered greater than in the case of the data being within the tolerance range. Thus, for each of these input items, a coefficient K (0<K<1) is set that causes the remaining service life Ja to be calculated short. The magnitude of the coefficient K is not uniform, and may be varied depending on the input item by weighting the importance of each input item based on the previously accumulated performance data.

First, the temporary remaining service life Jb is calculated as described above without using the input item (P2 to P4, P6, P7) data. Next, in a case in which these data are outside of the tolerance range, the coefficients K (K1, K2, K3, . . . ) set for each input item and the calculated temporary remaining service life Jb are multiplied together to calculate the remaining service life Ja (Ja=Jb×K1×K2 . . . ).

In an embodiment of the present invention, the actual service life Jr of the conveyor belt 12 is identified based on the calculated remaining service life Ja. In other words, the conveyor belt 12 use start time point and the time point when the remaining service life Ja of the conveyor belt 12 was calculated are known. Thus, the time period from the use start time point to the time point when the remaining service life Ja was calculated is found. The calculated remaining service life Ja is added to this found time period to identify the actual service life Jr. The actual service life Jr in an embodiment of the present invention in principle means a service life identified in this way based on the calculated remaining service life Ja.

The calculation unit 3 calculates the remaining service life Ja at a predetermined period (e.g., two weeks or one month). In this embodiment, an email notifying of the calculated remaining service life Ja is sent from the server 2 to the customer terminal device 7.

In this way, in the management system 1 according to an embodiment of the present invention, to monitor the state of the conveyor belt 12, in addition to the indicator P6 indicating the state of the belt conveyor device 9 and the indicator P7 indicating the use environment of the conveyor belt 12 where it is used, at least one input item from the five other input items is used. This allows the management system 1 to determine the state of the conveyor belt 12 in greater detail compared to the related art. This is advantageous in that the conveyor belt 12 becoming unusable is more reliably prevented.

In the management system 1, expected service life Jf of the conveyor belt 12 is calculated by the calculation unit 3 before the conveyor belt 12 is attached to the belt conveyor device 9. As described above, because the correlation database 4*d* is input into the storage unit 4, the data of the use condition (input items P6, P7 described above) of the conveyor belt 12, the data of the specifications of the conveyor belt, and the correlation database 4*d* are used to calculate the expected service life Jf. The calculated expected service life Jf is transmitted from the server 2 to the customer terminal device 7.

By the expected service life Jf of the conveyor belt 12 being calculated before use, an appropriate replacement period for the conveyor belt 12 can be determined in the early stages. Thus, the time and funds needed for preparing the replacement conveyor belt 12*a* can be easily secured. This is advantageous in that excess inventory of the conveyor belt can be reduced, the time in inventory can be easily shortened, and the running costs of the conveyor belt 12 can be lowered.

The calculated expected service life Jf has a slight error margin. Thus, in this embodiment, the remaining service life Ja is calculated as described above, making it easier to determine a more suitable replacement period for the conveyor belt 12. When the two service lives, the expected service life Jf and the remaining service life Ja, are known, it is easy to determine a suitable replacement period for the conveyor belt 12 without relying on only one service life.

In this embodiment, because at least one input item of the other input items P2 to P7 is used in addition to the amount of wear P1 of the upper cover rubber 13*a* as a basis for calculating the remaining service life Ja, it is possible to calculate the remaining service life Ja that is more in conformance with the actual status of the use site of the conveyor belt 12. In other words, the remaining service life Ja can be determined with higher accuracy, making it easier to determine a suitable replacement period for the conveyor belt 12. Thus, a number of replacement conveyor belts 12*a* no more than necessary are kept in inventory and inventory management becomes unnecessary. This is advantageous in that running costs are lowered.

In this embodiment, a communication is transmitted from the server 2 to the customer terminal device 7 notifying of an order period for the replacement conveyor belt 12*a* or a prompt to order the replacement conveyor belt 12*a* based on the amount of the conveyor belt 12 in inventory input into the inventory database 4*e* and the calculated remaining service life Ja of the conveyor belt 12.

Specifically, each time the calculation unit 3 calculates the remaining service life Ja, the amount of the conveyor belt 12 in inventory input into the inventory database 4*e* at the current time point is confirmed. If the required length of the replacement conveyor belt 12*a* is longer than the confirmed amount in inventory, the amount in inventory is insufficient. In this case, an email notifying of an order period of the replacement conveyor belt 12*a* identified by referencing the calculated remaining service life Ja and a predetermined period of time needed for delivery is sent from the server 2 to the customer terminal device 7. When the order period approaches, an email prompting the order of the replacement conveyor belt 12*a* is sent from the server 2 to the customer terminal device 7. As a result, sufficient preparation can be done for the replacing the conveyor belt 12.

When there is communication of an order for the replacement conveyor belt 12*a* from the customer terminal device 7, the communication is transmitted to the manufacturer terminal device 8 via the server 2 or directly to the manufacturer terminal device 8. Based on this order, the manufacturer delivers the conveyor belt 12*a* of the ordered specifications and length to the stockyard of the customer.

Note that for conveyor belts 12 with a short circumferential length, all (the entire circumferential length) of the conveyor belt 12 can be replaced, and for conveyor belts 12 with a long circumferential length, only the necessary portions (required length) can be replaced. Thus, for example, for input items (P1, P4, and P5), input data and data for identifying the position on the conveyor belt 12 in the circumferential direction corresponding to this data are both input into the server 2. In this way, the position and length of the conveyor belt 12 in need of replacement can be determined.

A database in which the cost required to replace the conveyor belt 12 is input, a database in which the time required for replacement is input, and the like can be stored in the storage unit 4 of the server 2. In such a configuration, the cost information required to replace the conveyor belt 12 can be transmitted from the server 2 to the customer terminal device 7. In addition, schedule management required for replacement of the conveyor belt 12 can be performed in a centralized manner using the server 2.

In a case in which the amount of wear P1 of the lower cover rubber 13*b* is added as an input item, the tolerance range (upper limit value) for the amount of wear P1 is input in advance into the tolerance range database 4*b*. Furthermore, in a case in which the amount of wear P1 of the lower cover rubber 13*b* input into the server 2 is outside of the tolerance range, an email may be sent to the customer terminal device 7 and/or the manufacturer terminal device 8 notifying that the amount of wear P1 is outside of the tolerance range. The customer or manufacturer that receives this email performs an inspection such as checking the rotation state of the support rollers 10*c* of the belt conveyor device 9, checking whether slippage is occurring between the conveyor belt 12 and the pulleys 10*a*, 10*b*, and checking whether the scraper is coming into contact with the lower cover rubber 13*b*. As a result, defects in the belt conveyor device 9 can be eliminated in the early stages.

REFERENCE SIGNS LIST

1 Management system
2 Server
3 Calculation unit
4 Storage unit
4*a* Belt specification database
4*b* Tolerance range database
4*c* Use condition database
4*d* Correlation database
4*e* Inventory database
5 Input unit
5*a* Wear amount input unit
5*b* Impact force input unit
5*c* Tensile force input unit
5*d* Core state input unit
5*e* Endless portion state input unit
5*f* Device state input unit
5*g* Use environment input unit
6 Transmission unit
7 Customer terminal device
8 Manufacturer terminal device
9 Belt conveyor device
10*a* Drive pulley
10*b* Driven pulley
10*c* Support roller
11 Take-up mechanism 12 Conveyor belt
13a Upper cover rubber
13b Lower cover rubber
13c Width direction end portion rubber
14 Core layer
15 Core (steel cord)
16A Non-endless portion
16B Endless portion
C Conveyed object

The invention claimed is:

1. A conveyor belt management system, comprising:
an input unit configured to input an indicator indicating a state of a belt conveyor device installed on site and an indicator indicating a use environment of a conveyor belt at a use site;
an input unit configured to input at least one input item from five input items consisting of an amount of wear of an upper cover rubber of the conveyor belt, an impact force acting on the conveyor belt, a tensile force, an indicator indicating a state of a core, and an indicator indicating a state of an endless portion; and
a server into which data of each of the input items are input;
the server comprising a calculation unit and a storage unit,
the storage unit storing a belt specification database in which specifications of the conveyor belt are input in advance and a tolerance range database in which a tolerance range for each of the input items input into the server per each of the specifications of the conveyor belt is input in advance, and
the calculation unit monitoring a state of the conveyor belt based on the data of each of the input items input into the server, the specifications of the conveyor belt input into the belt specification database, and the tolerance range input into the tolerance range database; and
the calculation unit calculating before the conveyor belt is installed on the belt conveyor device an expected service life of the conveyor belt based on a use condition of the belt conveyor device at the use site, specifications of the conveyor belt input into the belt specification database, and a correlation determined in advance between the use condition and the specifications of the conveyor belt and an actual service life of the conveyor belt,
wherein the expected service life as calculated by the calculation unit is sent from the server to a communicably connected customer terminal device.

2. The conveyor belt management system according to claim 1, wherein
the indicator indicating the state of the belt conveyor device comprises a conveyance speed of a conveyed object or a conveyance weight per unit time;
the indicator indicating the use environment of the conveyor belt at the use site comprises a value identifying a use environmental temperature and a conveyed object specification;
the indicator indicating the state of the core comprises a gap in a belt width direction between cores arranged side by side; and
the indicator indicating the state of the endless portion comprises a bonding length of the endless portion.

3. The conveyor belt management system according to claim 1, wherein
a remaining service life of the conveyor belt is calculated by the calculation unit based on data of the amount of wear input into the server, the specifications of the conveyor belt input into the belt specification database, and the tolerance range input into the tolerance range database; and
a length of the remaining service life is monitored as one state of the conveyor belt.

4. The conveyor belt management system according to claim 3, wherein
an inventory database into which an inventory amount of replacement conveyor belts for the conveyor belt at the use site or at a stockyard near the use site of the conveyor belt is input is stored in the storage unit; and
communication notifying of an order period of the replacement conveyor belt or communication prompting order thereof is sent from the server to the customer terminal device based on the inventory amount input in the inventory database and the remaining service life calculated.

5. The conveyor belt management system according to claim 2, wherein
a remaining service life of the conveyor belt is calculated by the calculation unit based on data of the amount of wear input into the server, the specifications of the conveyor belt input into the belt specification database, and the tolerance range input into the tolerance range database; and
a length of the remaining service life is monitored as one state of the conveyor belt.

6. The conveyor belt management system according to claim 5, wherein
an inventory database into which an inventory amount of replacement conveyor belts for the conveyor belt at the use site or at a stockyard near the use site of the conveyor belt is input is stored in the storage unit; and
communication notifying of an order period of the replacement conveyor belt or communication prompting order thereof is sent from the server to the customer terminal device based on the inventory amount input in the inventory database and the remaining service life calculated.

* * * * *